US011209044B2

(12) United States Patent
Inoue

(10) Patent No.: US 11,209,044 B2
(45) Date of Patent: Dec. 28, 2021

(54) BEARING BODY

(71) Applicant: Suncall Corporation, Kyoto (JP)

(72) Inventor: Masayuki Inoue, Kyoto (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 16/647,406

(22) PCT Filed: Sep. 25, 2018

(86) PCT No.: PCT/JP2018/035429
§ 371 (c)(1),
(2) Date: Mar. 13, 2020

(87) PCT Pub. No.: WO2019/065621
PCT Pub. Date: Apr. 4, 2019

(65) Prior Publication Data
US 2020/0217357 A1 Jul. 9, 2020

(30) Foreign Application Priority Data

Sep. 29, 2017 (JP) ............................. JP2017-191130

(51) Int. Cl.
*F16C 13/02* (2006.01)
*F16C 17/02* (2006.01)
(Continued)

(52) U.S. Cl.
CPC .............. *F16C 13/02* (2013.01); *F16C 13/04* (2013.01); *F16C 17/02* (2013.01); *F16C 17/26* (2013.01); *B65H 2404/17* (2013.01)

(58) Field of Classification Search
CPC .......... F16C 13/02; F16C 13/04; F16C 17/02; F16C 17/022; F16C 17/26; F16C 33/02;
(Continued)

(56) References Cited

U.S. PATENT DOCUMENTS 3,051,535 A * 8/1962 Klint .................. F16C 33/10
384/219
6,390,700 B1 * 5/2002 Foster .................. B41J 13/076
384/145

(Continued)

FOREIGN PATENT DOCUMENTS

JP 57-40715 3/1982
JP 05-016027 A 1/1993
(Continued)

OTHER PUBLICATIONS

Merriam-Webster, definition of "conventinal" obtained Jun. 30, 2021.*

(Continued)

Primary Examiner — James Pilkington
(74) Attorney, Agent, or Firm — Sterne, Kessler, Goldstein & Fox P.L.L.C.

(57) ABSTRACT

A bearing body is provided. The bearing body includes first and second support surfaces inclined so as to slope upward from a side on the imaginary central vertical plane passing through an axis of a rotating shaft to be supported toward one and the other outer sides in the width direction of the rotating shaft. First and second transitional regions that respectively make transitions from the first and second support surfaces to a first and end surface of the bearing body on one side in the axial direction of the rotating shaft have a curved shape projecting obliquely upward such that an orientation of a normal line changes from a perpendicular direction to a parallel direction with respect to the axis of the rotating shaft toward one side from the other side in the axial direction of the rotating shaft.

9 Claims, 20 Drawing Sheets

(51) Int. Cl.
*F16C 17/26* (2006.01)
*F16C 13/04* (2006.01)

(58) Field of Classification Search
CPC ............ F16C 2326/58; B65H 2404/17; B65H 2404/52; B65H 2301/41306; B65H 49/325; B41J 13/076
See application file for complete search history.

(56) References Cited

U.S. PATENT DOCUMENTS

| | | | |
|---|---|---|---|
| 6,626,573 B2 * | 9/2003 | Orndorff, Jr. ....... | F16C 33/1065 384/98 |
| 6,769,683 B2 * | 8/2004 | Hiramatsu ............... | B65H 5/06 271/274 |
| 7,318,675 B2 * | 1/2008 | Kellogg, Jr. ........... | B65G 33/32 198/672 |
| 8,235,521 B2 * | 8/2012 | Sunouchi ............... | B65H 29/14 347/104 |
| 2004/0017461 A1 * | 1/2004 | Saito ....................... | F16C 17/02 347/104 |
| 2008/0138003 A1 * | 6/2008 | Tsui ................... | G03G 15/0233 384/215 |

FOREIGN PATENT DOCUMENTS

| | | |
|---|---|---|
| JP | 09-110232 A | 4/1997 |
| JP | 2001-292552 A | 10/2001 |
| JP | 2014-516144 A | 7/2014 |
| JP | 2015-197508 A | 11/2015 |

OTHER PUBLICATIONS

International Search Report issued in corresponding International Application No. PCT/JP2018/035429, dated Dec. 11, 2018.

\* cited by examiner

PRIOR ART

PRIOR ART

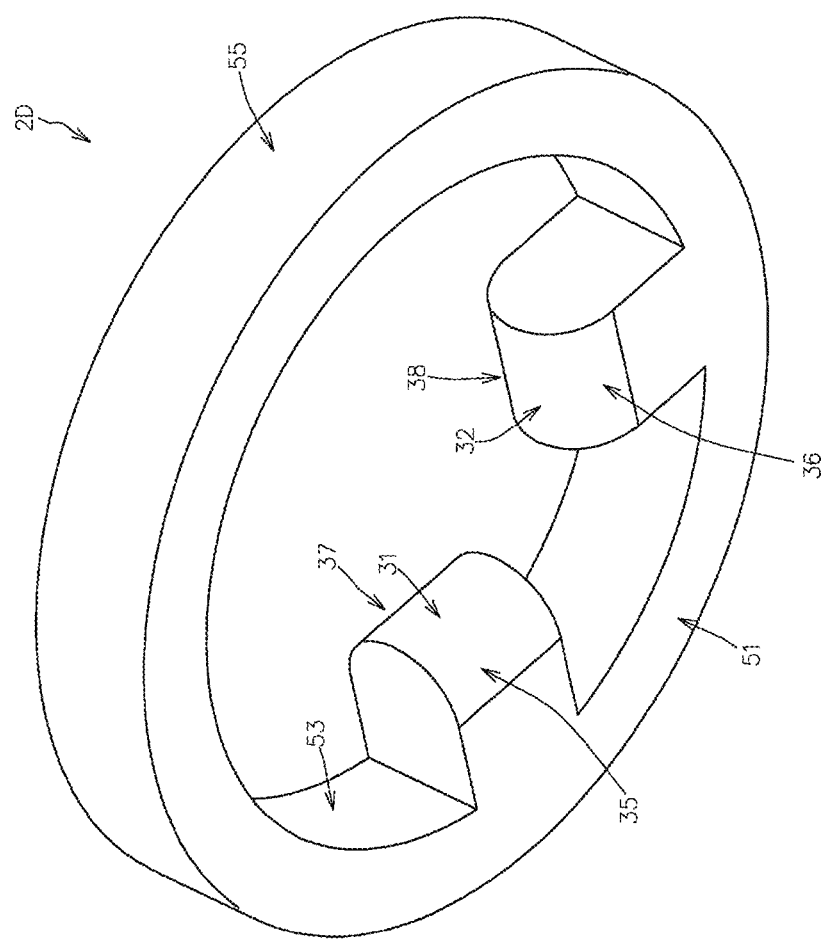

BEARING BODY

FIELD OF THE INVENTION

The present invention relates to a bearing body for slidably supporting a rotating shaft so as to be rotatable around the axis.

BACKGROUND ART

Bearing bodies for slidably supporting a rotating shaft so as to be rotatable around the axis are widely used in various fields.

For example, such bearing bodies are also used in sheet conveying structures in image forming apparatuses such as printers and fax machines.

FIG. 10 shows a perspective view of a conventional bearing body 200.

FIG. 11 shows a schematic plan view of a sheet conveying structure 300 including the conventional bearing body 200.

Moreover, FIG. 12 and FIG. 13 show cross-sectional views taken along the lines XII-XII and XIII-XIII in FIG. 11, respectively.

As shown in FIG. 11 and FIG. 13, the sheet conveying structure 300 includes a first rotating shaft 110, a pair of bearing bodies 200, 200 supporting the first rotating shaft at respective sides in the axial direction of the first rotating shaft 110, and a second rotating shaft 120 that is in parallel with and relatively pressed toward the first rotating shaft 110, wherein the first and second rotating shafts 110, 120 are caused to act as a drive shaft and a driven shaft, respectively, and thereby a sheet 105 is sandwiched and conveyed between the rotating shafts 110, 120.

The second rotating shaft 120 has a shaft body 121 to be rotated around the axis and pressure rollers 125 supported by the shaft body 121 so as to be relatively rotatable such that the sheet 105 to be conveyed can be sandwiched between the first rotating shaft 110 and the second rotating shaft 120 between the pair of bearing bodies 200, 200 in the axial direction.

In the sheet conveying structure 300 shown in FIG. 11 to FIG. 13, a downward load is applied from the second rotary shaft 120 to a central part of the first rotary shaft 110 located between the pair of bearing bodies 200, 200, and thus the central part of the first rotary shaft 110 is bent downward, with the points of contact with the bearing bodies 200 being fulcrums.

As shown in FIG. 10, the conventional bearing body 200 has a planar inner end surface 211 facing the center side in the axial direction of the first rotating shaft 110; a planar outer end surface 213 facing the outer side in the axial direction of the first rotating shaft 110; an upper surface 215 connecting the upper ends of the inner end surface 211 and the outer end surface 213 to each other; a lower surface 217 connecting the lower ends of the inner end surface 211 and the outer end surface 213 to each other and forming an installation surface; a first side surface 219 connecting the ends on one side in the width direction of the inner end surface 211, the outer end surface 213, the upper surface 215, and the lower surface 217; and a second side surface 221 connecting the ends on the other side in the width direction of the inner end surface 211, the outer end surface 213, the upper surface 215, and the lower surface 217.

The upper surface 215 has a planar first support surface 231 that is inclined such that the lowest point of which is where an imaginary central vertical plane VP (see FIG. 13) passes through the axis of the first rotating shaft 110 and such that the first support surface 231 slopes upward from the lowest point toward one side in the width direction, and a planar second support surface 232 that is disposed so as to be symmetrical to the first support surface 231 with respect to the imaginary central vertical plane VP and forms a V-shaped bearing groove in cooperation with the first support surface 231, wherein the first rotating shaft 110 is slidably supported by the first and second support surfaces 231, 232 so as to be immovable in the width direction and rotatable around the axis.

The bearing body 200 has the following disadvantages.

As shown in FIG. 10, in the conventional bearing body 200, the plane directions of the first and second support surfaces 231, 232 are parallel with the axial direction of the first rotating shaft 110 and are substantially perpendicular to the substantially vertical planar inner end surface 211.

Accordingly, when the central part of the first rotating shaft 110 located between the pair of bearing bodies 200, 200 receives a downward load and is bent downward, the first rotating shaft 110 is in point-contact with the substantially right-angled boundary edge between the first support surface 231 and the inner end surface 211 as well as the substantially right-angled boundary edge between the second support surface 232 and the inner end surface 211, and the outer surface of the first rotating shaft 110 may be damaged.

This point is problematic particularly in a case where the first rotating shaft 110 has a coating film on the outer surface.

That is to say, a portion of the first rotating shaft 110 that comes into contact with the sheet 105 is provided with a coating film containing a filler such as ceramic to improve conveying performance, and, depending on the specifications or requirements, the entirety of the first rotating shaft 110 including the portions supported by the bearing bodies 200 may be provided with an anti-corrosion coating film as a base coat for the filler-containing coating film.

Thus, in a case where the portions of the first rotating shaft 110 supported by the bearing bodies 200 are provided with an anti-corrosion coating film, the filler-containing coating film wears away due to the point contact between the first rotating shaft 110 and the conventional bearing bodies 200, and the durability of the first rotating shaft 110 is impaired.

Meanwhile, as a bearing body having another configuration, a bearing body having an arc-shaped bearing groove that corresponds to the outer circumferential shape of a rotating shaft to be supported has been proposed (see, for example, Patent Literature 1 below).

The bearing body described in Patent Literature 1 has a planar inner end surface facing the center side in the axial direction of the rotating shaft, a planar outer end surface facing the outer side in the axial direction of the rotating shaft, an upper surface connecting the upper ends of the inner end surface and the outer end surface to each other, a lower surface connecting the lower ends of the inner end surface and the outer end surface to each other, a first side surface connecting the ends on one side in the width direction of the inner end surface and the outer end surface to each other, and a second side surface connecting the ends on the other side in the width direction of the inner end surface and the outer end surface to each other.

The bearing body has a bearing groove that is open to the upper surface and the inner end surface.

The bearing groove as viewed in the axial direction of the rotating shaft has an arc shape that corresponds to a part of the outer circumferential shape of the rotating shaft.

In this bearing body as well, the inner circumferential surface of the arc-shaped bearing groove and the inner end surface intersect substantially at a right angle and, accordingly, when a downward load is applied to the central part in the axial direction of the rotating shaft, there are the same disadvantages as the bearing body 200 shown in FIG. 10.

Moreover, in order to stably support the rotating shaft with the bearing body described in Patent Literature 1, it is necessary to precisely match the radius of curvature of the arced bearing groove and the radius of the rotating shaft, and thus there is also a problem that it is difficult to reduce the manufacturing costs of the bearing body.

PRIOR ART DOCUMENT

Patent Literature

Patent Literature 1: JP 2015-197508A

SUMMARY OF THE INVENTION

The present invention has been conceived in view of the conventional art described above, and an object of the present invention is to provide a bearing body capable of slidably supporting a rotating shaft so as to be rotatable around the axis while effectively preventing or reducing damage to the outer surface of the rotating shaft.

In order to achieve the object, a first aspect of the present invention provides a bearing body for supporting a rotating shaft so as to be rotatable around an axis, the bearing body including: a first end surface facing one side in an axial direction of the rotating shaft, a second end surface facing the other side in the axial direction of the rotating shaft, and first and second support surfaces respectively located on more toward one side and the other side in a width direction of the rotating shaft than an imaginary central vertical plane passing through an axis of the rotating shaft is, so as to be symmetrical to each other with respect to the imaginary central vertical plane, wherein the first and second support surfaces are inclined so as to slope upward from a side on the imaginary central vertical plane toward an outer side in the width direction of the rotating shaft such that the rotating shaft disposed therebetween is slidably supported so as to be immovable in the width direction and rotatable around the axis, and wherein the first and second support surfaces respectively transition to the first end surface via first and second transitional regions, and the first and second transitional regions have a curved shape projecting obliquely upward such that an orientation of a normal line changes from a perpendicular direction to a parallel direction with respect to the axis of the rotating shaft toward one side from the other side in the axial direction of the rotating shaft.

According to the bearing body of the first aspect of the present invention, since the first and second support surfaces that are symmetrical to each other with respect to the imaginary central vertical plane passing through the axis of the rotating shaft to be supported are inclined to be upward from a side on the imaginary central vertical plane toward an outer side in the width direction of the rotating shaft so as to slidably support the rotating shaft in an immovable manner in the width direction and in a rotatable manner around the axis, the first and second support surfaces respectively transition to the first end surface via first and second transitional regions, and the first and second transitional regions have a curved shape projecting obliquely upward such that an orientation of the normal line changes from the perpendicular direction to the parallel direction with respect to the axis of the rotating shaft toward one side from the other side in the axial direction of the rotating shaft, it is possible to slidably support the rotating shaft so as to be rotatable around the axis while effectively preventing or reducing damage to the outer surface of the rotating shaft.

In particular, in a case where the rotating shaft is provided with a coating film on the outer surface, the bearing body makes it possible to effectively prevent or reducing a removal of the coating film, and then support the rotating shaft in a state of enhancing a durability of the rotating shaft.

For example, the first transitional region may include the entirety of the first support surface in the axial direction of the rotating shaft, and the second transitional region may include the entirety of the second support surface in the axial direction of the rotating shaft.

Alternatively, the first and second support surfaces respectively may have first and second planar regions extending from the second end surface toward one side from the other side in the axial direction of the rotating shaft and terminating within a thickness of the bearing body. In this case, the first transitional region starts from one side in the axial direction of the first planar region, and the second transitional region starts from one side in the axial direction of the second planar region.

In order to achieve the object, a second aspect of the present invention provides a bearing body for supporting a rotating shaft so as to be rotatable around an axis, the bearing body including: first and second end surfaces respectively facing one side and the other side in an axial direction of the rotating shaft, and first and second support surfaces respectively disposed on more toward one side and the other side in a width direction of the rotating shaft than an imaginary central vertical plane passing through an axis of the rotating shaft is, so as to be symmetrical to each other with respect to the imaginary central vertical plane, wherein the first and second support surfaces are inclined so as to slope upward from a side on the imaginary central vertical plane toward an outer side in the width direction of the rotating shaft such that the rotating shaft disposed therebetween is slidably supported so as to be immovable in the width direction and rotatable around the axis, wherein the first and second support surfaces transition to the first end surface via a first-end-surface-side first transitional region and a first-end-surface-side second transitional region that are symmetrical to each other with respect to the imaginary central vertical plane, and transition to the second end surface via a second-end-surface-side first transitional region and a second-end-surface-side second transitional region that are symmetrical to each other with respect to the imaginary central vertical plane, wherein the first-end-surface-side first transitional region and the first-end-surface-side second transitional region have a curved shape projecting obliquely upward such that an orientation of a normal line changes from a perpendicular direction to a parallel direction with respect to the axis of the rotating shaft toward one side in the axial direction of the rotating shaft, and wherein the second-end-surface-side first transitional region and the second-end-surface-side second transitional region have a curved shape projecting obliquely upward such that an orientation of a normal line changes from a perpendicular direction to a parallel direction with respect to the axis of the rotating shaft toward the other side in the axial direction of the rotating shaft.

According to the bearing body of the first aspect of the present invention, since the first and second support surfaces that are symmetrical to each other with respect to the imaginary central vertical plane passing through the axis of the rotating shaft to be supported are inclined to be upward from a side on the imaginary central vertical plane toward an outer side in the width direction of the rotating shaft so as to slidably support the rotating shaft in an immovable manner in the width direction and in a rotatable manner around the axis, the first and second support surfaces transition to the first end surface via a first-end-surface-side first transitional region and a first-end-surface-side second transitional region, and also transition to the second end surface via a second-end-surface-side first transitional region and a second-end-surface-side second transitional region, the first-end-surface-side first transitional region and the first-end-surface-side second transitional region have a curved shape projecting obliquely upward such that an orientation of a normal line changes from a perpendicular direction to a parallel direction with respect to the axis of the rotating shaft toward one side in the axial direction of the rotating shaft, and the second-end-surface-side first transitional region and the second-end-surface-side second transitional region have a curved shape projecting obliquely upward such that an orientation of a normal line changes from a perpendicular direction to a parallel direction with respect to the axis of the rotating shaft toward the other side in the axial direction of the rotating shaft, it is possible to slidably support the rotating shaft so as to be rotatable around the axis while effectively preventing or reducing damage to the outer surface of the rotating shaft even when the bearing body is used so as to support the central part between one and the other end portions in the axial direction of the rotating shaft.

In particular, in a case where the rotating shaft is provided with a coating film on the outer surface, the bearing body makes it possible to effectively prevent or reducing a removal of the coating film, and then support the rotating shaft in a state of enhancing a durability of the rotating shaft.

In a preferable embodiment of the second aspect, the first-end-surface-side first transitional region and the first-end-surface-side second transitional region are symmetrical to the second-end-surface-side first transitional region and the second-end-surface-side second transitional region with respect to an imaginary transverse plane perpendicular to the axis of the rotating shaft at a center in a thickness direction of the bearing body along the axial direction of the rotating shaft.

In any one of the above various configurations, the first support surface may be inclined such that the lowest point of which is where the imaginary central vertical plane passes and such that the first support surface may slope upward from the lowest point toward one side in the width direction, the second support surface may be inclined so as to slope upward from the lowest point toward the other side in the width direction, and the first and second support surfaces may form a V-groove as viewed in the axial direction of the rotating shaft.

For example, the first transitional region may be provided over the entirety of the first support surface in the width direction of the rotating shaft, and the second transitional region may be provided over the entirety of the second support surface in the width direction of the rotating shaft.

Alternatively, it is possible that the first transitional region is provided only in a part of a region between the lowest point and the highest point of the first support surface, and the second transitional region is provided only in a part of a region between the lowest point and the highest point of the second support surface.

One embodiment, the bearing body according to the present invention may be a single member including the first and second support surfaces in an integrated manner.

Alternatively, the bearing body according to the present invention may include a first separate bearing body having the first support surface and a second separate bearing body having the second support surface and being separate from the first separate bearing body.

For example, the bearing body according to the present invention may include an upper surface connecting upper ends of the first end surface and the second end surface to each other and a lower surface connecting lower ends of the first end surface and the second end surface to each other and forming an installation surface, wherein the first and second support surfaces are provided on the upper surface.

Alternatively, the bearing body according to the present invention may be a ring shape in which the first end surface and the second end surface are annular.

In this case, the first and second support surfaces are provided on an inner circumferential surface connecting radially inner ends of the first end surface and the second end surface to each other.

BRIEF DESCRIPTION OF THE DRAWINGS

FIG. 20 is a perspective view of a bearing body according to a third modification of the second embodiment.

EMBODIMENT FOR CARRYING OUT THE INVENTION

First Embodiment

Below, one embodiment of the bearing body according to the present invention will now be described with reference to the appended drawings.

Figure 1:
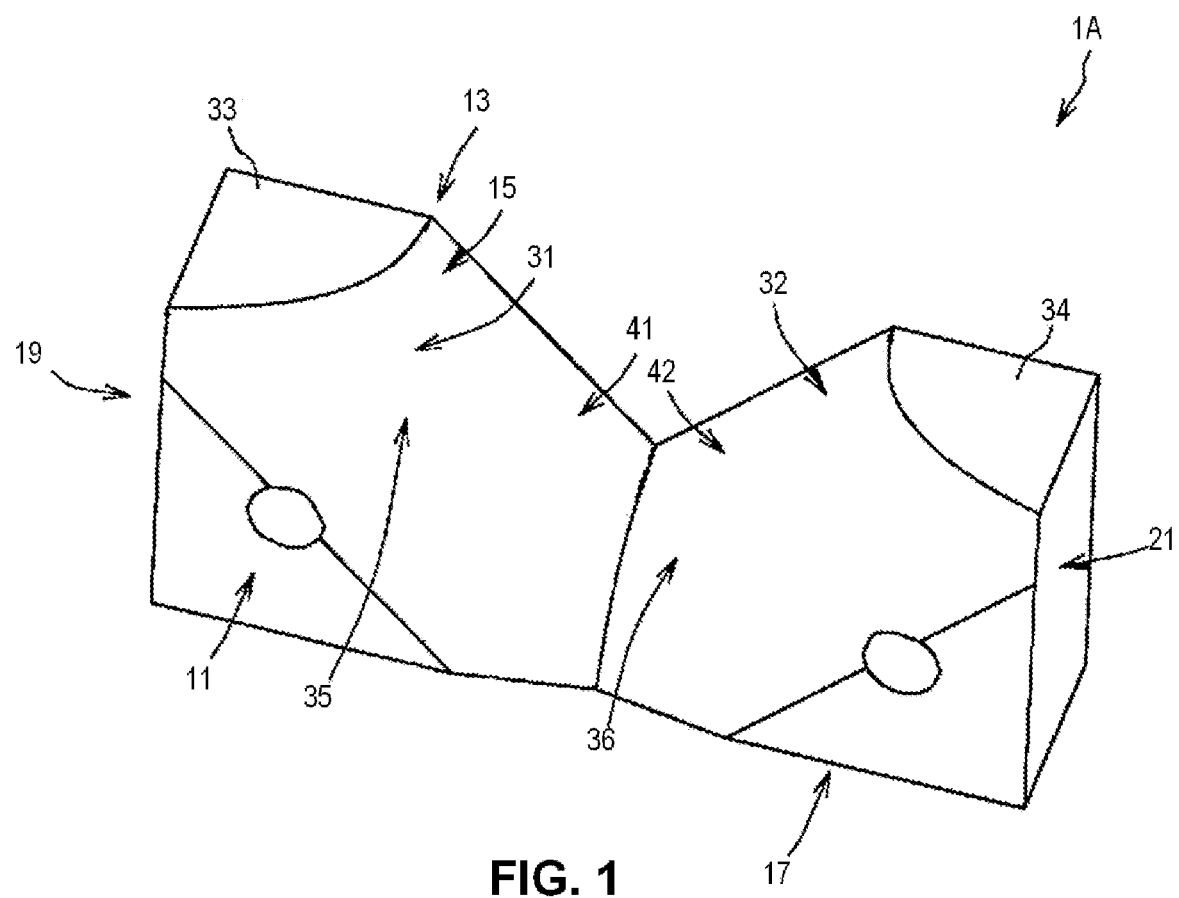
FIG. 1 is a perspective view of a bearing body according to a first embodiment of the present invention, with an outer profile of a conventional bearing body shown by broken lines.

FIG. 1 shows a perspective view of a bearing body 1A according to the present embodiment.

Figure 2:
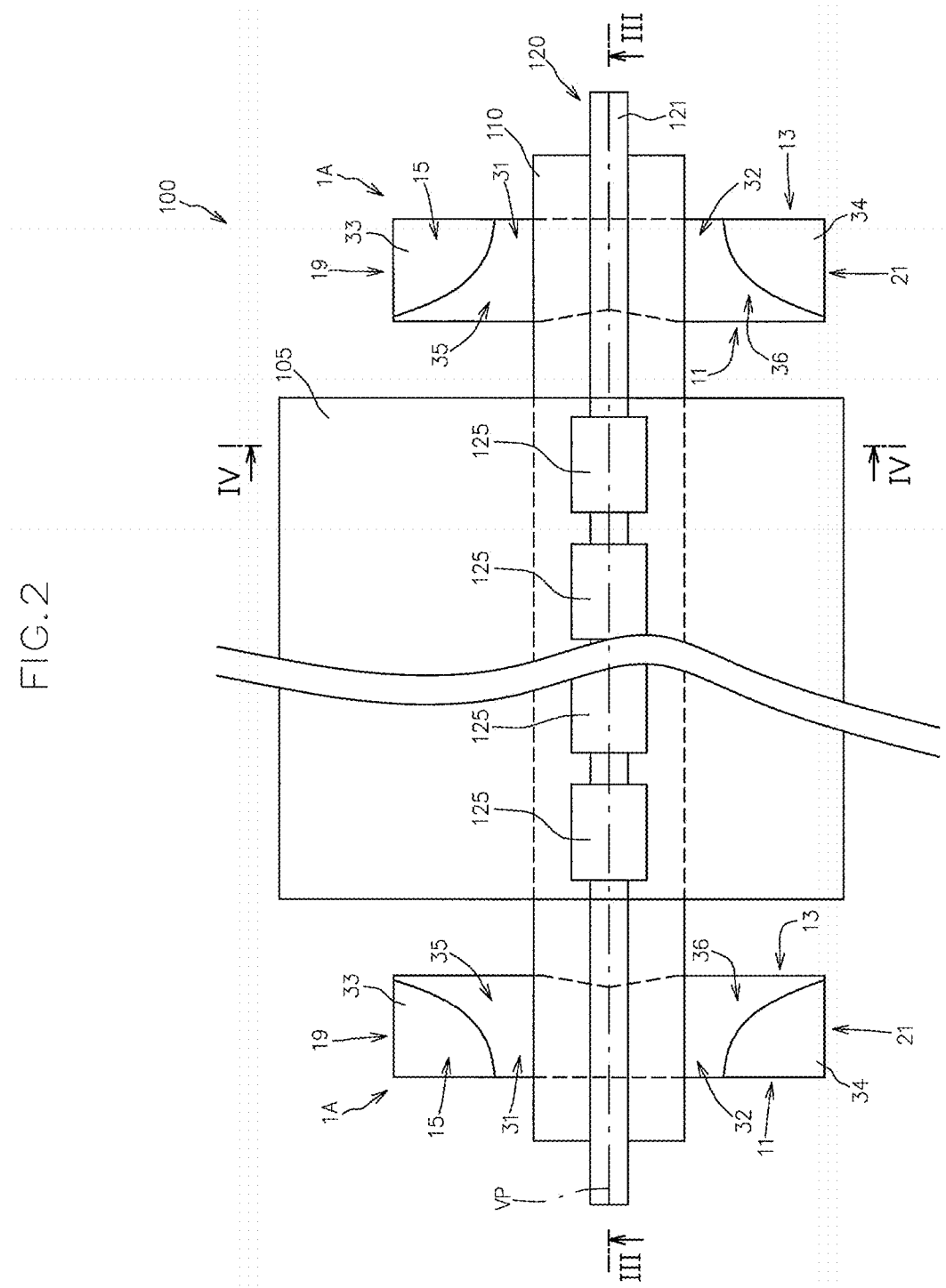
FIG. 2 is a schematic plan view of a sheet conveying structure including the bearing body shown in FIG. 1.

FIG. 2 is a schematic plan view of a sheet conveying structure 100 in an image forming apparatus such as a printer, wherein the sheet conveying structure 100 includes the bearing body 1A.

Figure 3:
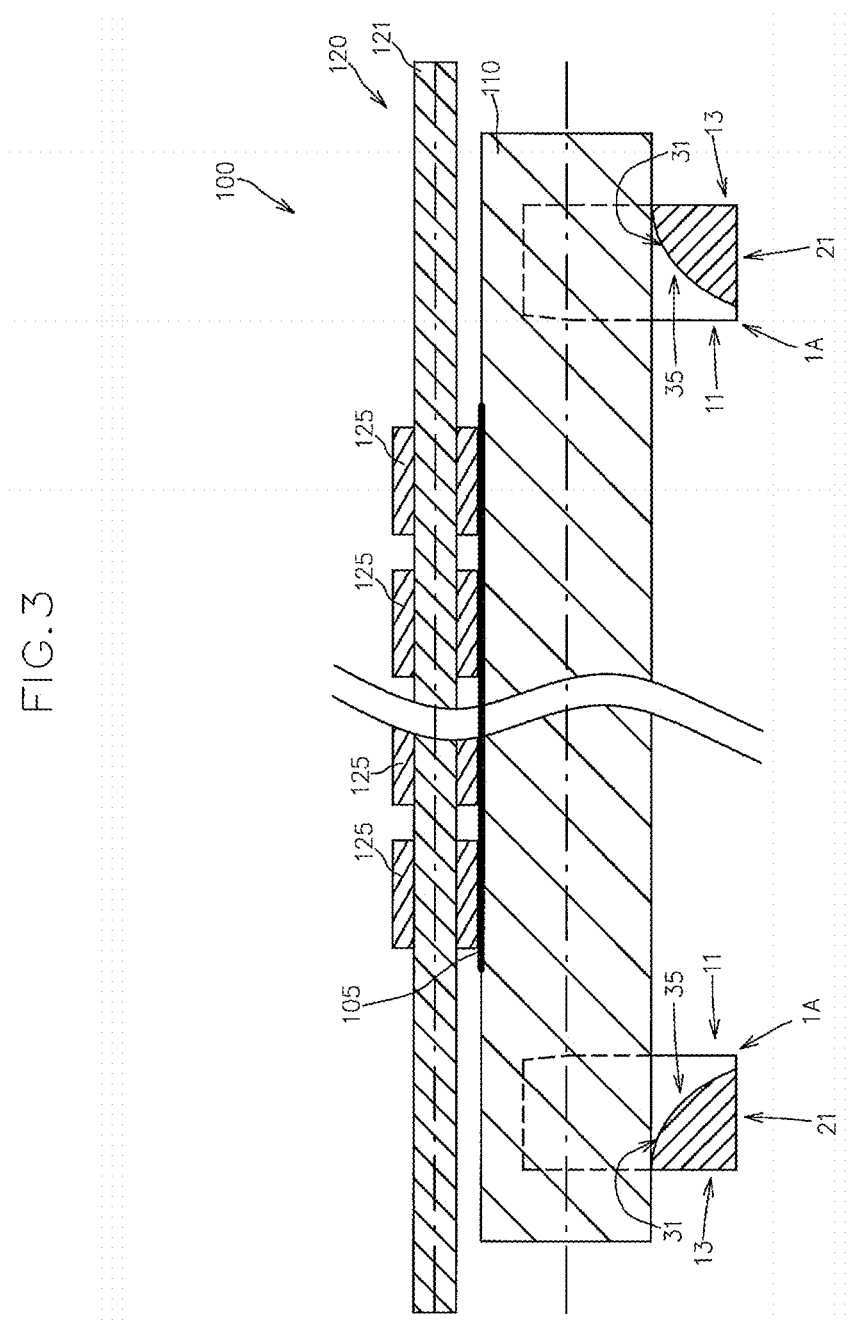
FIG. 3 is a schematic cross-sectional view taken along the line III-III in FIG. 2.
Figure 4:
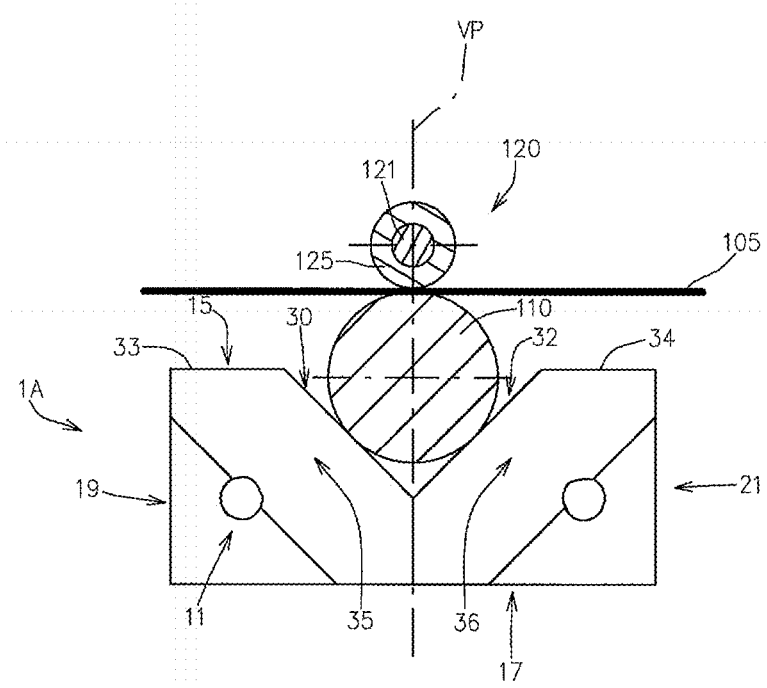
FIG. 4 is a schematic cross-sectional view taken along the line IV-IV in FIG. 2.

Moreover, FIG. 3 and FIG. 4 respectively show schematic cross-sectional views taken along the lines and IV-IV in FIG. 2.

First, the sheet conveying structure 100 will now be described.

The sheet conveying structure 100 includes a first rotating shaft 110 acting as a paper feeding roller and a second rotating shaft 120 that is in parallel with the first rotating shaft 110 and is relatively pressed toward the first rotating shaft 110 so as sandwich and convey a sheet 105 such as paper in cooperation with the first rotating shaft 110, wherein the first and second rotating shafts 110, 120 act as a drive shaft and a driven shaft, respectively.

The sheet conveying structure 100 further includes a pair of bearing bodies 1A, 1A for slidably supporting one side and the other side in the axial direction of the first rotating shaft 110, respectively, so as to be immovable in the width direction and rotatable around the axis.

The second rotating shaft 120 has a shaft body 121 to be rotated around the axis and pressure rollers 125 supported by the shaft body 121 between the pair of bearing bodies 1A, 1A in the axial direction so as to be capable of relative rotation such that the conveyed sheet 105 can be sandwiched between the first rotating shaft 110 and the pressure rollers 125.

In the sheet conveying structure 100 shown in FIG. 2 to FIG. 4, a central part of the first rotary shaft 110 located between the pair of bearing bodies 1A, 1A receives a downward load from the second rotary shaft 120, and thus the central part of the first rotary shaft 110 is bent downward, with the points of contact with the bearing bodies 1A being fulcrums.

In this regard, the bearing body 1A according to the present embodiment has the following configuration so as to be capable of, even when a downward load is applied to the central part of a rotating shaft to be supported (in FIG. 2 to FIG. 4, the first rotating shaft 110), the central part being located more toward the center side in the axial direction than the bearing body 1A is, slidably supporting the rotating shaft (the first rotating shaft 110) such that the rotating shaft is rotatable around the axis while effectively preventing or reducing damage to the rotating shaft.

That is to say, as shown in FIG. 1 to FIG. 4, the bearing body 1A has a first end surface 11 facing a first side that is one side in the axial direction of the rotating shaft 110 (in the present embodiment, the center side in the axial direction), a second end surface 13 facing a second side that is the other side in the axial direction of the rotating shaft 110 (in the present embodiment, the outer side in the axial direction), and first and second support surfaces 31, 32 located between the first end surface 11 and the second end surface 13 in the axial direction of the rotating shaft 110 and supporting the rotating shaft.

The bearing body 1A according to the present embodiment further has an upper surface 15 connecting the upper ends of the inner end surface 11 and the outer end surface 13 to each other; a lower surface 17 connecting the lower ends of the inner end surface 11 and the outer end surface 13 to each other and forming an installation surface; a first side surface 19 connecting the ends on one side in the width direction of the inner end surface 11, the outer end surface 13, the upper surface 15, and the lower surface 17; and a second side surface 21 connecting the ends on the other side in the width direction of the inner end surface 11, the outer end surface 13, the upper surface 15, and the lower surface 17, wherein the first and second support surfaces 31, 32 are provided on the upper surface 15.

Specifically, the first and second support surfaces 31, 32 are respectively disposed more toward one side and the other side in the width direction of the rotary shaft 110 than an imaginary central vertical plane VP (see FIG. 2 and FIG. 4) extending substantially vertically through the axis of the rotating shaft 110 so that the first and second support surfaces 31, 32 are mutually symmetrical with respect to the imaginary central vertical plane VP.

As shown in FIG. 1 and FIG. 4, the first and second support surfaces 31, 32 are inclined so as to slope upward from the imaginary central vertical plane VP side toward the outer side in the width direction of the rotary shaft 110 and, accordingly, the rotating shaft 110 disposed between them can be slidably supported so as to be immovable in the width direction and rotatable around the axis.

In the present embodiment, as shown in FIG. 1 and the like, the upper surface 15 has, in addition to the first and second support surfaces 31, 32, a first horizontal surface 33 extending substantially horizontally from the upper end of the first support surface 31 outward toward one side in the width direction of the rotating shaft 110 and a second horizontal surface 34 extending substantially horizontally from the upper end of the second support surface 32 outward toward the other side in the width direction of the rotating shaft 110.

Here, as shown in FIG. 1 and the like, in the bearing body 1A according to the present embodiment, the first support surface 31 transitions to the first end surface 11 via a first transitional region 35, and the first transitional region 35 has a curved shape projecting obliquely upward such that the orientation of a normal line changes from a perpendicular direction to a parallel direction with respect to the axis of the rotating shaft 110 from the second side toward the first side in the axial direction of the rotating shaft 110 (in the present embodiment, from the outer side toward the center side in the axial direction).

The second support surface 32 transitions to the first end surface 11 via a second transitional region 36, and the second transitional region 36 has a shape symmetrical to the first transitional region 31 with respect to the imaginary central vertical plane VP, i.e., a curved shape projecting obliquely upward such that the orientation of a normal line changes from a perpendicular direction to a parallel direction with respect to the axis of the rotating shaft 110 from the second side toward the first side in the axial direction of the rotating shaft 110 (in the present embodiment, from the outer side toward the center side in the axial direction).

In FIG. 1, a planar first support surface 231, a planar second support surface 232, and a planar first end surface 211 of a conventional bearing body 200 (see FIG. 10 described below) are indicated by broken lines.

The first transitional region 35 can be formed by, for example, curving the conventional bearing body 200 having the planar first support surface 231, the second support surface 232, and the first end surface 211 such that a region bridging the first support surface 231 side and the first end surface 211 side where an imaginary edge 231a between the first support surface 231 and the first end surface 211 is at the center has a curved shape that projects upward.

Similarly, the second transitional region 36 can be formed by curving the conventional bearing body 200 such that a region bridging the second support surface 232 side and the first end surface 231 side where an imaginary edge 232a between the second support surface 232 and the first end surface 211 is at the center has a curved shape that projects upward.

According to the bearing body 1A having this configuration, it is possible to effectively prevent or reduce damage to the outer surface of the first rotating shaft 110 resulting from a contact of the first rotating shaft 110 with the edge part of the bearing body 1A even when a downward load is applied to the central part of the first rotating shaft 110, and the central part is bent downward.

In the present embodiment, the first transitional region 35 includes the entirety of the first support surface 31 in the axial direction, and the second transitional region 36 includes the entirety of the second support surface 32 in the axial direction, as shown in FIG. 1 and the like. Alternatively, the first and second transitional regions 35, 36 can be configured so as to respectively include only a part of the first and second support surfaces 31, 32 in the axial direction.

Figure 5:
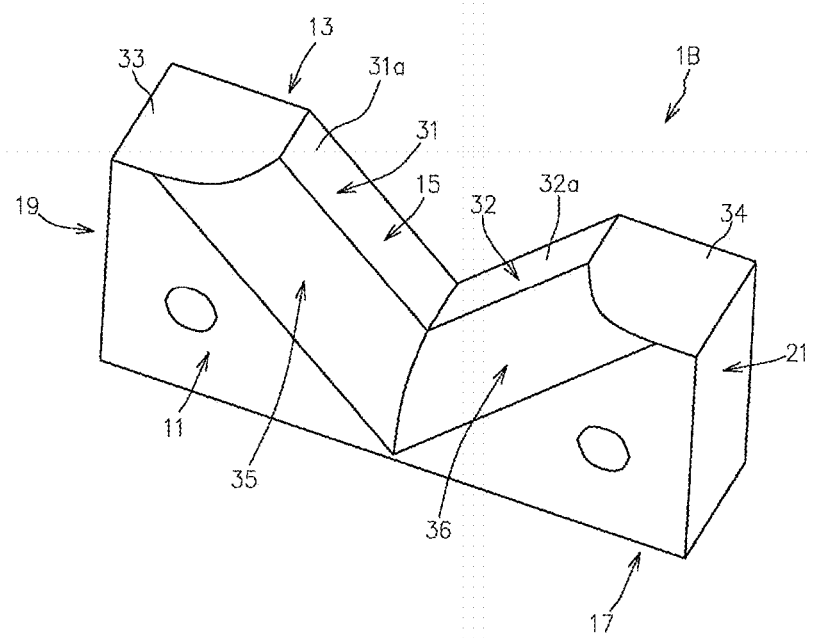
FIG. 5 is a perspective view of a bearing body according to a first modification of the first embodiment.

FIG. 5 shows a perspective view of a bearing body 1B according to a first modification of the present embodiment.

In FIG. 5, the same parts as those in the above embodiment are given the same reference numbers.

As shown in FIG. 5, in the first modification 1B, the first and second support surfaces 31, 32 respectively have first and second planar regions 31a, 32a that extend from the outer end surface 13 in parallel with the axial direction of the rotating shaft 110, i.e., from the second side toward the first side in the axial direction of the rotating shaft 110 (in the present modification, from the outer side toward the center side in the axial direction), and terminate within the thickness of the bearing body 1B.

The first and second transitional regions 35, 36 respectively start from the second side in the axial direction of the first and second planar regions 31a, 32a (in the present embodiment, the center side in the axial direction).

With the first modification 1B having this configuration as well, the same effect as the embodiment 1A can be obtained.

As shown in, for example, FIG. 1 and FIG. 4, the bearing body 1A according to the present embodiment has a first inclined surface 41 such that the lowest point of which is where the imaginary central vertical plane VP passes and such that the first inclined surface 41 slopes upward from the lowest point toward one side in the width direction, and a second inclined surface 42 that slopes upward from the lowest point to the other side in the width direction and forms a V-groove in cooperation with the first inclined surface 41, wherein the entirety of the first and second inclined surfaces 41, 42 in the width direction forms the first and second support surfaces 31, 32, respectively.

In the present embodiment, as shown in FIG. 1 and the like, the first transitional region 35 is provided over the entirety of the first support surface 31 in the width direction of the rotating shaft 110, and the second transitional region 36 is provided over the entirety of the second support surface 32 in the width direction of the rotating shaft 110.

Figure 6:
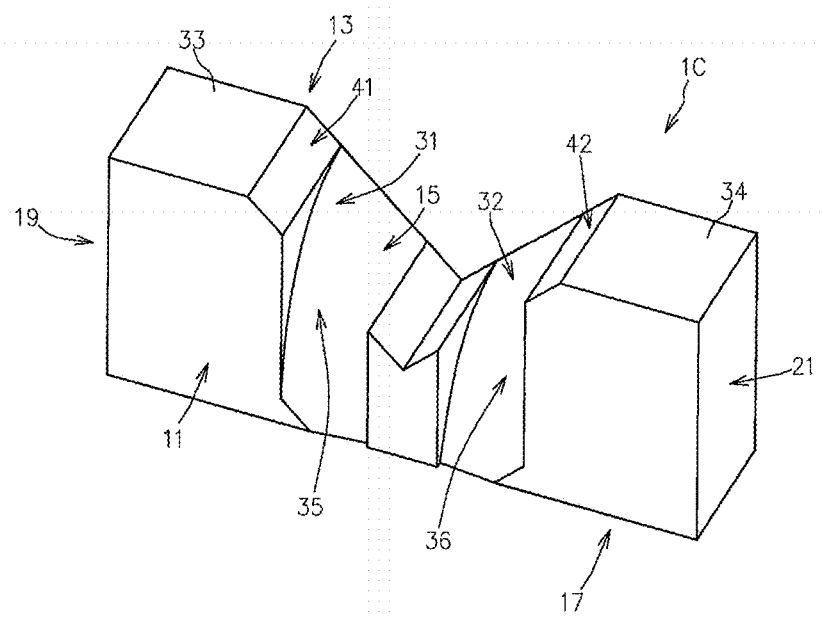
FIG. 6 is a perspective view of a bearing body according to a second modification of the first embodiment.

Alternatively, as in a bearing body 1C according to a second modification shown in FIG. 6, it is possible to make modifications such that the first transitional region 35 is provided only in a part of the region between the lowest point and the highest point of the first support surface 31 that is the first inclined surface 41, and the second transitional region 36 is provided only in a part of the region between the lowest point and the highest point of the second support surface 32 that is the second inclined surface 42.

With the second modification 1C having this configuration as well, the same effect as the embodiment 1A can be obtained.

Figure 7:
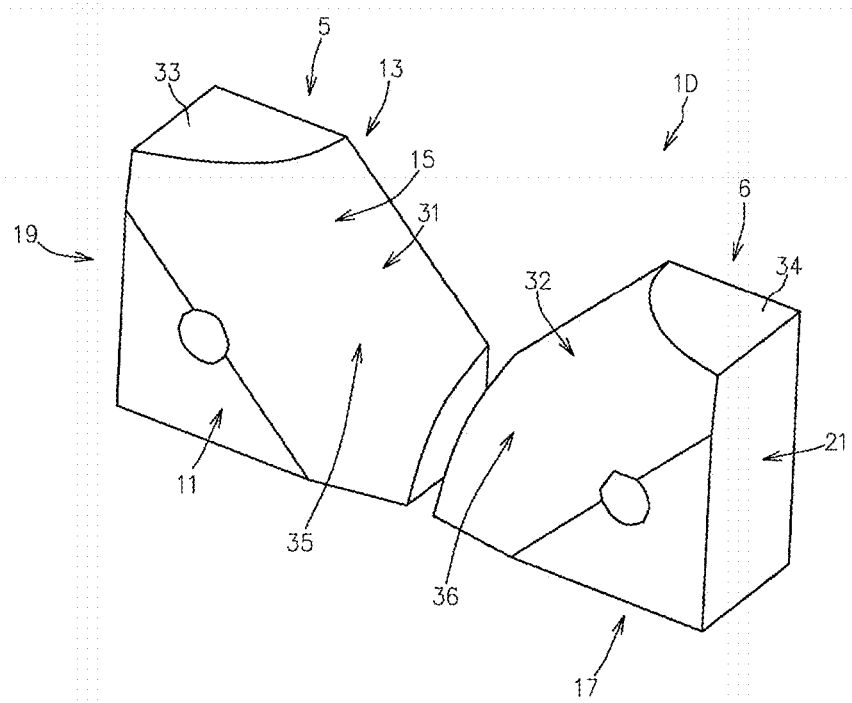
FIG. 7 is a perspective view of a bearing body according to a third modification of the first embodiment.

Moreover, while the bearing body 1A according to the present embodiment has the first and second support surfaces 31, 32 in an integral manner as shown in, for example, FIG. 1 and FIG. 4, it is also possible instead to provide a component having the first support surface 31 and a component having the second support surface 32 as separate components as in a bearing body 1D according to the third modification shown in FIG. 7.

That is to say, the bearing body 1D according to the third modification has a first separate bearing body 5 having the first support surface 31 and a second separate bearing body 6 having the second support surface 32 and being a separate component from the first separate bearing body 5, wherein the first and second separate bearing bodies 5, 6 are each arranged separately.

With the third modification 1D having this configuration as well, the same effect as the embodiment 1A can be obtained.

Naturally, in the bearing bodies 1B, 1C according to the first and second modifications as well, it is also possible to separately provide a component having the first support surface 31 and a component having the second support surface 32.

Figure 8:
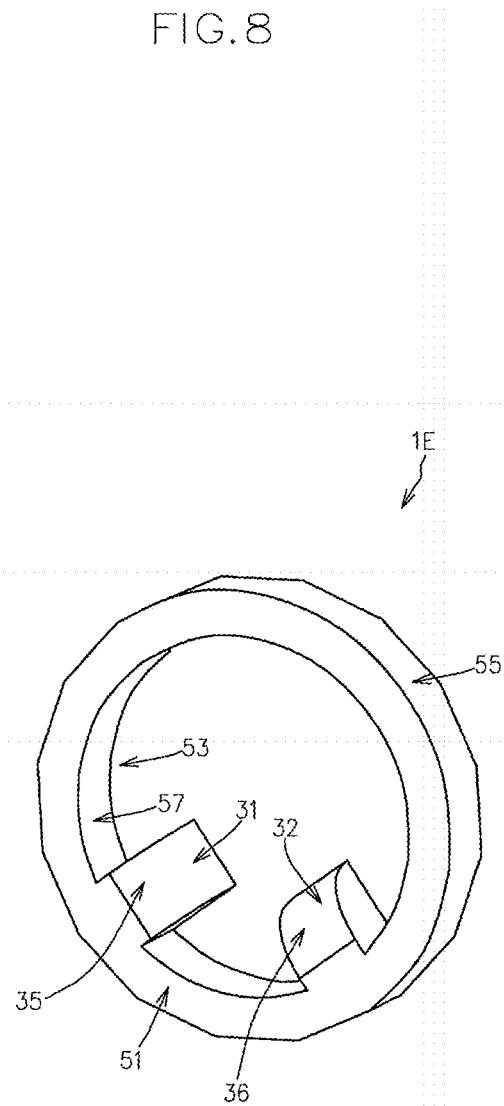
FIG. 8 is a perspective view of a bearing body according to a fourth modification of the first embodiment.

Moreover, while the bearing bodies 1A to 1D according to the present embodiment and the first to third modifications have a pedestal shape that is open upward, it is also possible instead to configure the bearing bodies such that a rotating shaft to be supported is surrounded as in a bearing body 1E according to the fourth modification shown in FIG. 8.

That is to say, the bearing body 1E according to the fourth modification has a hollow ring shape into which a rotating shaft to be supported is inserted, and has an annular first end surface 51 facing a first side that is one side in the axial direction of the rotating shaft (in the present modification, the center side in the axial direction), an annular second end surface 53 facing a second side that is the other side in the axial direction of the rotating shaft (the outer side in the axial direction), an outer circumferential surface 55 connecting the outer ends in the radial direction of the first end surface 51 and the second end surface 53 to each other, and an inner circumferential surface 57 connecting the inner ends in the radial direction of the first end surface 51 and the second end surface 53 to each other, wherein the first and second support surfaces 31, 32 are provided on the inner circumferential surface 57.

With the fourth modification 1E having this configuration as well, the same effect as the embodiment 1A can be obtained.

Here, a verification experiment performed on the sheet conveying structure 100 including one example (a working example) of the bearing body 1A according to the present embodiment will now be described.

The verification experiment was performed under the following conditions.

A steel rotating shaft having a length of 300 mm and an outer diameter of 10 mm and having a 5 μm thick coating film formed of an epoxy phenol coating material on the outer surface was provided as the first rotating shaft 110, and the respective ends, i.e., two points, in the axial direction of the first rotating shaft 110 were supported by 8 mm thick bearing bodies 1A, 1A formed of polyoxymethylene (POM) resin having the shape shown in FIG. 1.

A rotating shaft in which five pressure rollers 125 made of urethane resin were supported on a steel shaft body 121 was provided as the second rotating shaft 120, and, as shown in FIG. 2 to FIG. 4, the second rotating shaft 120 was disposed so as to press the first rotating shaft 110 such that A4 size plain paper was sandwiched and conveyed in a longitudinal orientation by the first and second rotating shafts 110, 120.

The pressure applied to the first rotating shaft 110 by the second rotating shaft 120 was 0.6 kg per pressure roller so that a load of 3 kg was applied as a whole.

In this state, the first rotating shaft 110 was rotated by a motor.

The rotational speed of the motor was 500 rpm.

The first rotating shaft 110 was rotated the number of times corresponding to conveying 100,000 sheets of A4 size plain paper in a longitudinal orientation, and then an image of the damaged outer surface of the first rotating shaft 110 was captured.

Figure 9:
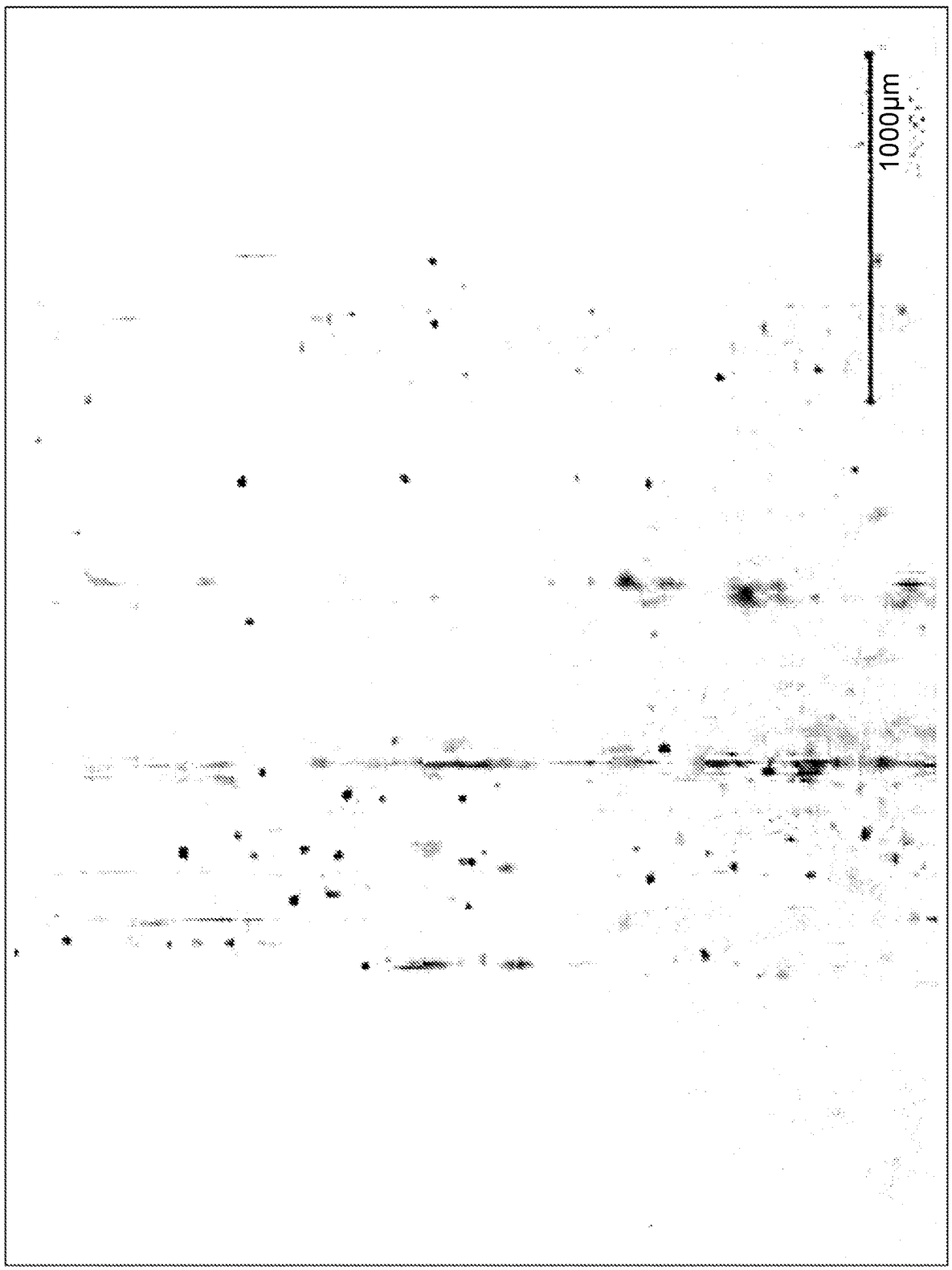
FIG. 9 is a result of a verification experiment performed on the sheet conveying structure shown in FIGS. 2-4, and is a development image of the rotating shaft supported by the bearing body according to the first embodiment.

FIG. 9 shows a development view of the captured image.

Figure 10:
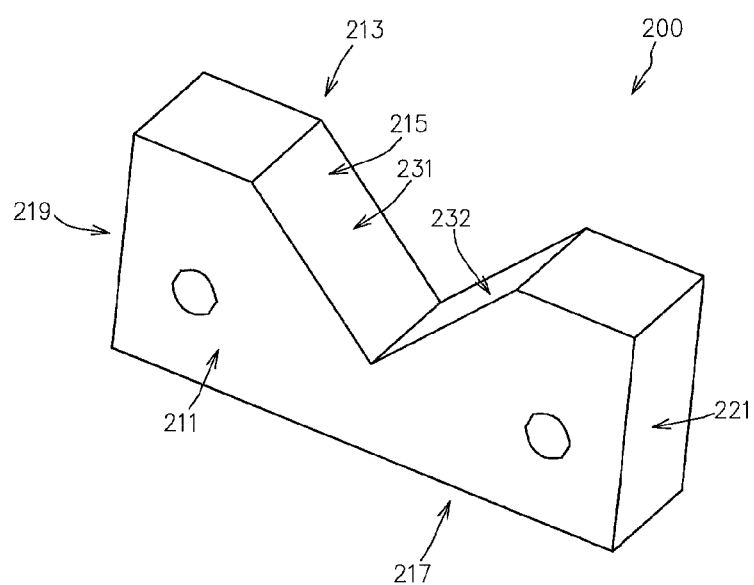
FIG. 10 is a perspective view of a conventional bearing body.

As a comparative example, the same experiment was performed on the sheet conveying structure 300 including the conventional bearing body 200 shown in FIG. 10.

As shown in FIG. 10, the conventional bearing body 200 has a planar first end surface (an inner end surface) 211 facing one side (a center side) in the axial direction of a rotating shaft to be supported; a planar second outer end surface 213 facing the other side (an outer side) in the axial direction of the rotating shaft; an upper surface 215 connecting the upper ends of the first end surface 211 and the second end surface 213 to each other; a lower surface 217 connecting the lower ends of the first end surface 211 and the second end surface 213 to each other and forming an installation surface; a first side surface 219 connecting the ends on one side in the width direction of the first end surface 211, the second end surface 213, the upper surface 215, and the lower surface 217; and a second side surface 221 connecting the end parts on the other side in the width direction of the first end surface 211, the second end surface 213, the upper surface 215, and the lower surface 217, wherein the upper surface 215 has planar first and second support surfaces 231, 232 that respectively slope upward from an imaginary central vertical plane passing through the axis of the rotating shaft toward one side and the other side in the width direction of the rotating shaft so as to form a V groove, the lowest point of which is where the imaginary central vertical plane intersects.

Figure 11:
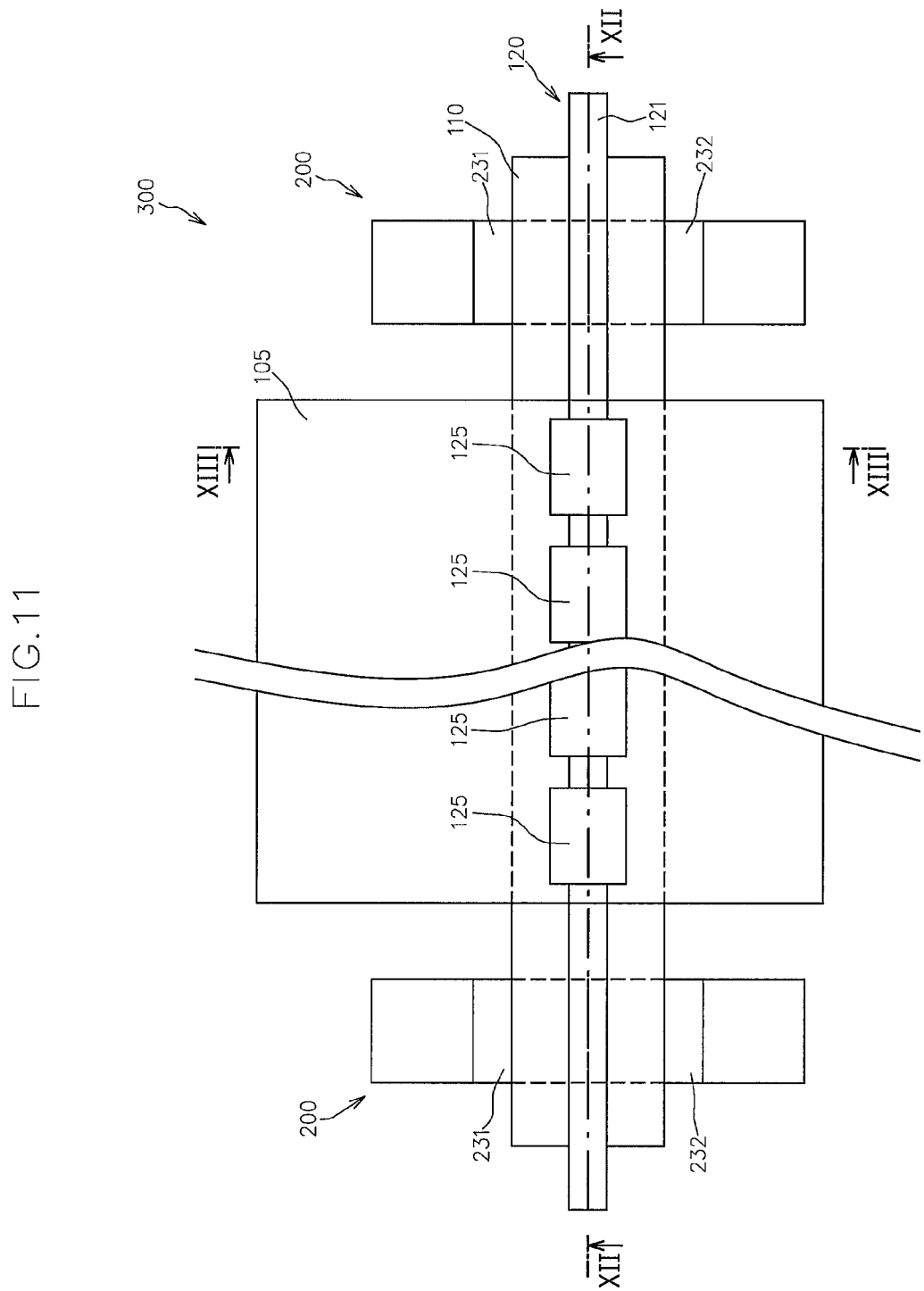
FIG. 11 is a schematic plan view of a sheet conveying structure including the conventional bearing body shown in FIG. 10.

FIG. 11 shows a schematic plan view of the sheet conveying structure 300 including the conventional bearing body 200 shown in FIG. 10.

Figure 12:
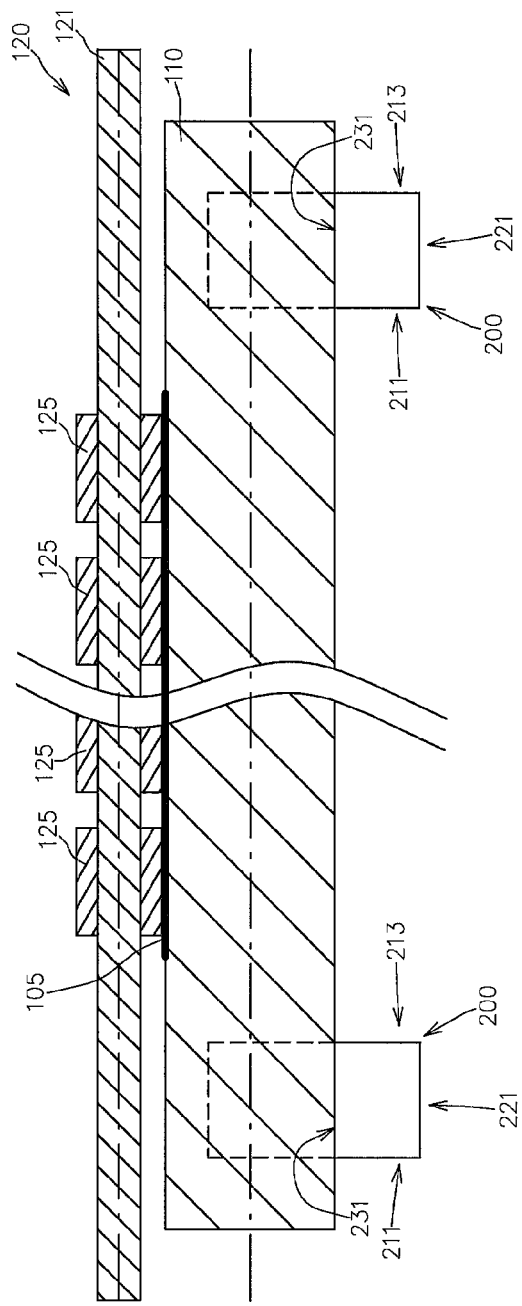
FIG. 12 is a schematic cross-sectional view taken along the line XII-XII in FIG. 11.
Figure 13:
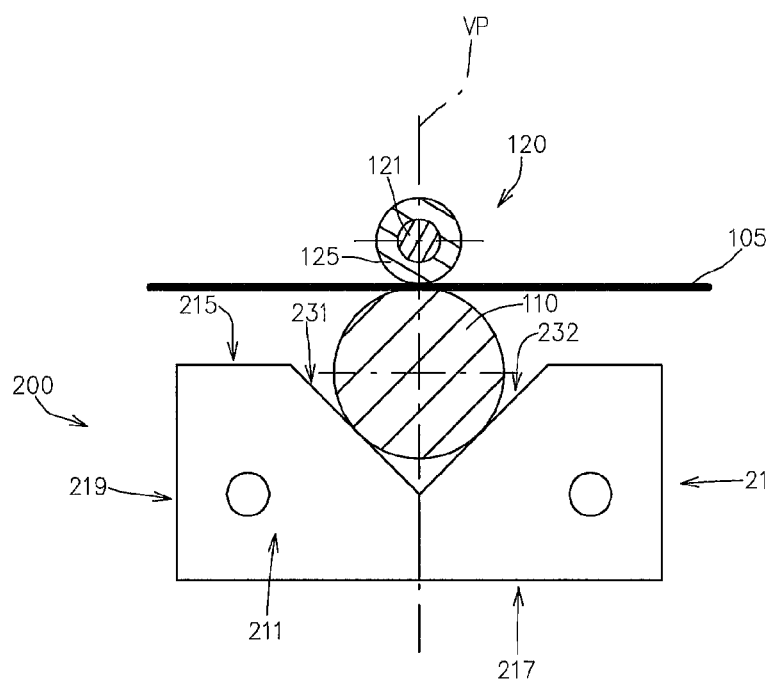
FIG. 13 is a schematic cross-sectional view taken along the line XIII-XIII in FIG. 11.

FIG. 12 and FIG. 13 show schematic cross-sectional views taken along the lines XII-XII and XIII-XIII in FIG. 11, respectively.

In FIG. 11 to FIG. 13, the same components as those in FIG. 2 to FIG. 4 are given the same reference numbers.

An experiment was performed on the sheet conveying structure 300 including the conventional bearing body 200 under the same pressure conditions and the same rotational speed as the verification experiment performed on the sheet conveying structure 100.

The first rotating shaft 110 was rotated the number of times corresponding to conveying 30,000 sheets of A4 size plain paper in a longitudinal orientation, and then an image of the damaged outer surface of the first rotating shaft 110 was captured.

Figure 14:
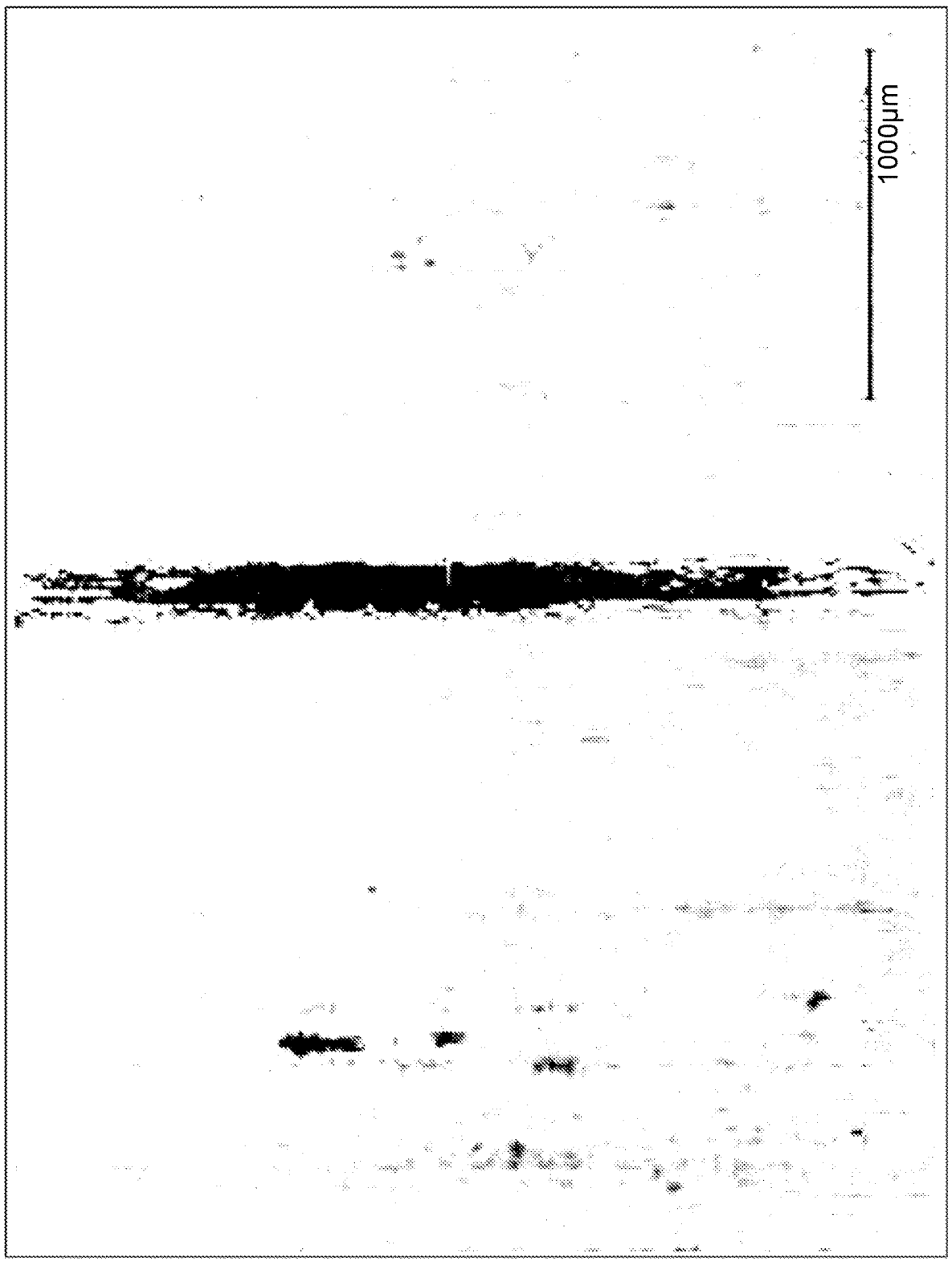
FIG. 14 is a result of a verification experiment performed on the sheet conveying structure shown in FIGS. 11-13, and is a development image of the rotating shaft supported by the conventional bearing body.

FIG. 14 shows a development view of the captured image.

As shown in FIG. 14, in the comparative example, when the outer surface of the first rotating shaft 110 was examined after the first rotating shaft 110 was rotated the number of times corresponding to conveying 30,000 sheets of A4 size plain paper in a longitudinal orientation, there were cracks in the coating film on the outer surface of the first rotating shaft 110.

On the other hand, as shown in FIG. 9, in the working example, when the outer surface of the first rotating shaft 110 was examined after the rotating shaft 110 was rotated the number of times corresponding to conveying 100,000 sheets of A4 size plain paper in a longitudinal orientation, there were no cracks in the coating film on the outer surface of the first rotating shaft 110.

Second Embodiment

Below, another embodiment of the bearing body according to the present invention will now be described with reference to the appended drawings.

Figure 15:
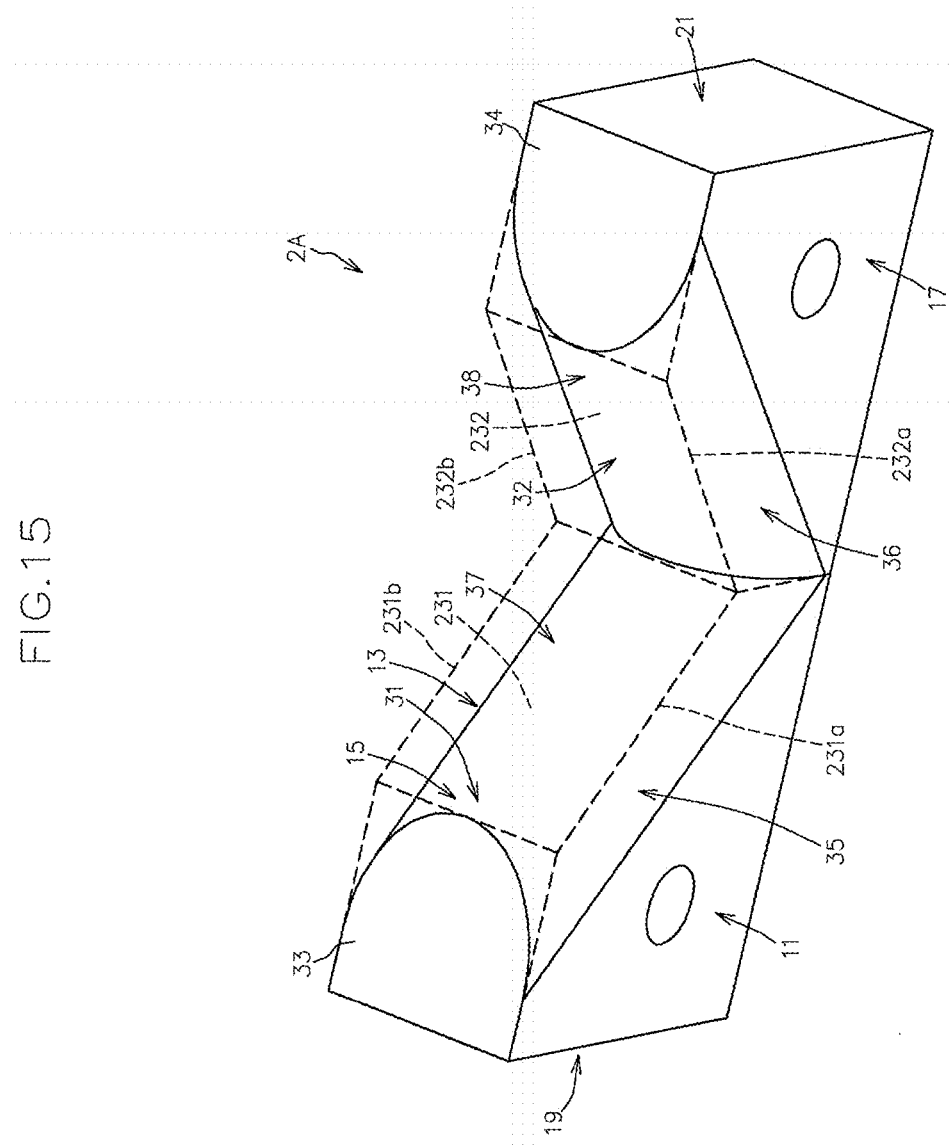
FIG. 15 is a perspective view of a bearing body according to a second embodiment of the present invention, with an outer profile of the conventional bearing body shown by broken lines.

FIG. 15 is a perspective view of a bearing body 2A according to the present embodiment.

Figure 16:
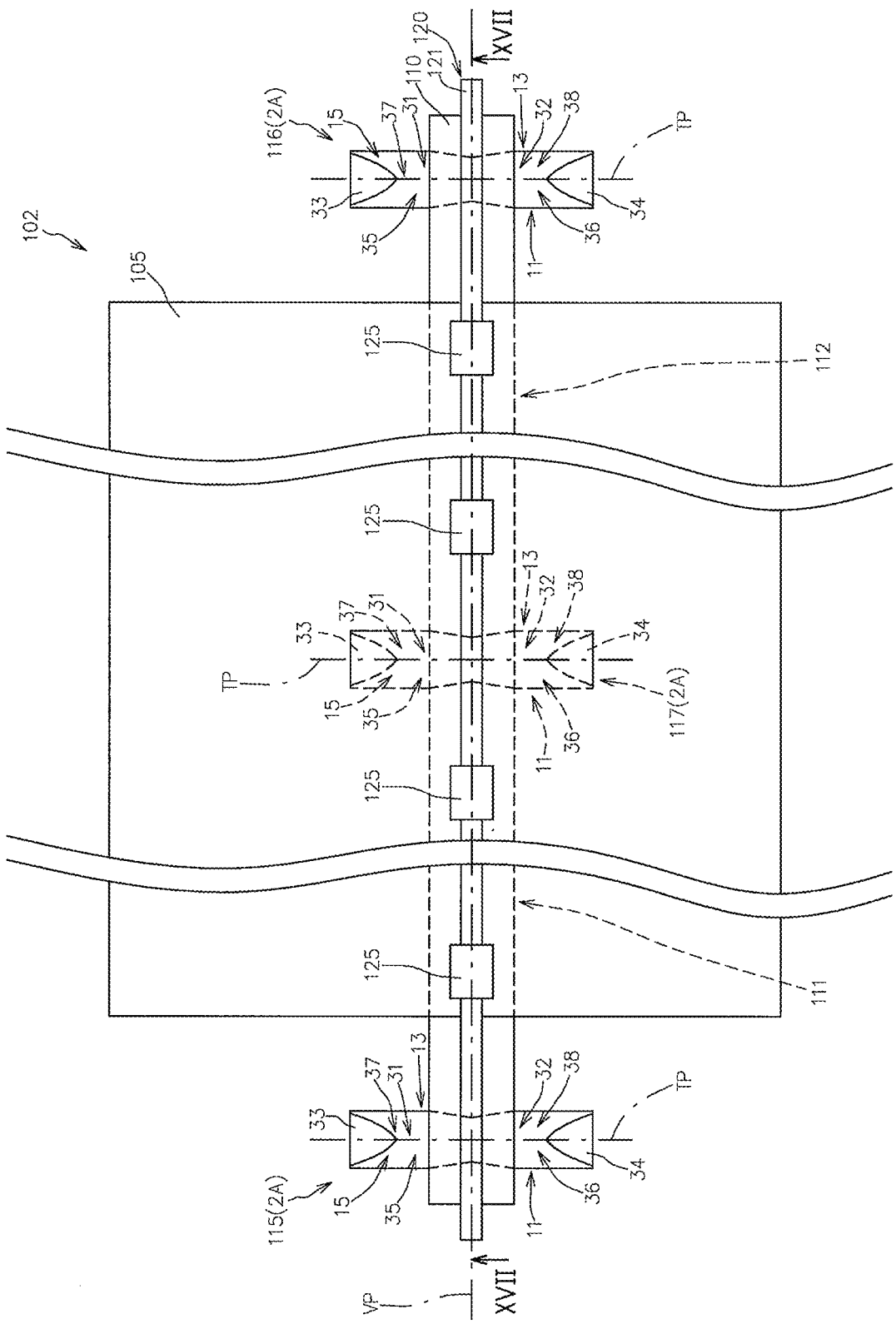
FIG. 16 is a schematic plan view of a sheet conveying structure including the bearing body shown in FIG. 15.

FIG. 16 is a schematic plan view of a sheet conveying structure 102 including the bearing body 2A in an image forming apparatus such as a printer.

Figure 17:
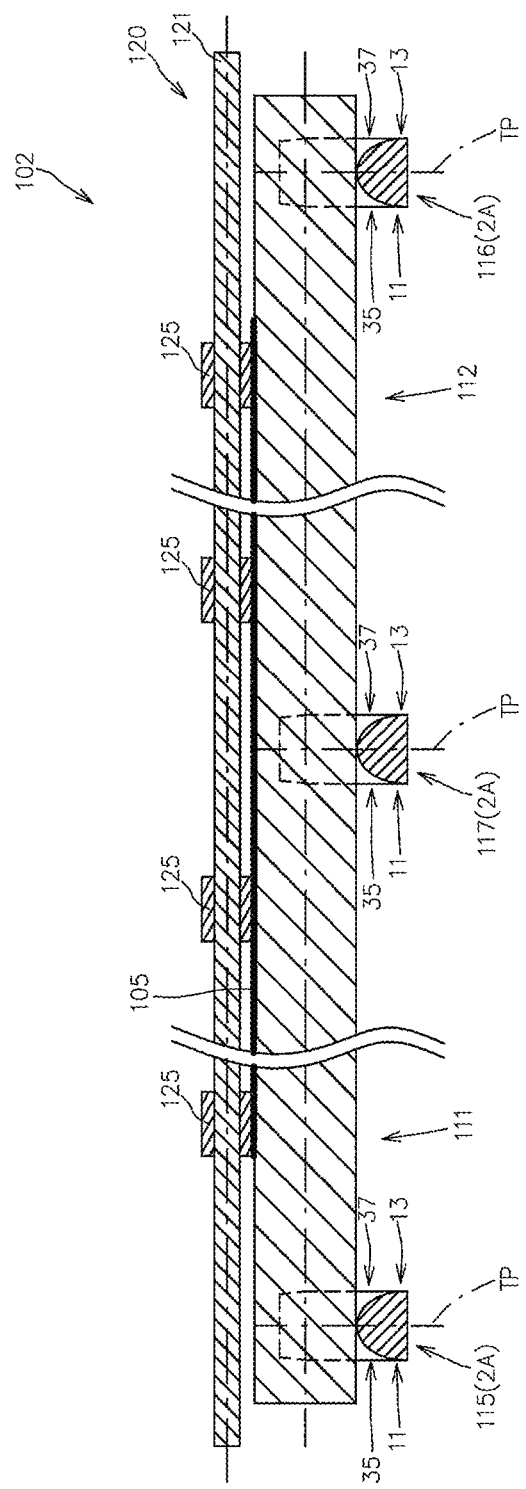
FIG. 17 is a schematic cross-sectional view taken along the line XVII-XVII in FIG. 16.

Moreover, FIG. 17 shows a schematic cross-sectional view taken along the line XVII-XVII in FIG. 16.

In the drawing, the same components as those in the first embodiment are given the same reference numbers, and descriptions thereof are omitted as appropriate.

In the bearing body 1A according to the first embodiment, transitional regions (the first and second transitional regions 35, 36) are provided only on the side where one of the first and second end surfaces 11, 13 (the first end surface 11) is.

On the other hand, in the bearing body 2A according to the present embodiment, a transitional region is provided on both sides in the thickness direction of the bearing body 2A along the axial direction of a rotating shaft to be supported (the first rotating shaft 110) as shown in FIG. 15.

That is to say, the bearing body 2A is the same as the bearing body 1A according to the first embodiment in terms of that the first support surface 31 transitions to the first end surface 11 via a first-end-surface-side first transitional region 35, and the second support surface 32 transitions to the first end surface 11 via a first-end-surface-side second transitional region 36 that is symmetrical to the first-end-surface-side first transitional region 35 with respect to the imaginary central vertical plane VP (see FIG. 16).

In addition, as shown in FIG. 15, the bearing body 2A is configured such that the first support surface 31 transitions to the second end surface 13 via a second-end-surface-side first transitional region 37, and the second support surface 32 transitions to the second end surface 13 via a second-end-surface-side second transitional region 38 that is symmetrical to the second-end-surface-side first transitional region 37 with respect to the imaginary central vertical plane VP (see FIG. 16).

The first-end-surface-side first transitional region 35 and the first-end-surface-side second transitional region 36 have a curved shape projecting obliquely upward such that the orientation of a normal line changes from a perpendicular direction to a parallel direction with respect to the axis of the first rotating shaft 110 toward one side in the axial direction of the first rotating shaft 110, and, on the other hand, the second-end-surface-side first transitional region 37 and the second-end-surface-side second transitional region 38 have a curved shape projecting obliquely upward such that the orientation of a normal line changes from a perpendicular direction to a parallel direction with respect to the axis of the first rotating shaft 110 toward the other side in the axial direction of the first rotating shaft 110.

According to the bearing body 2A having this configuration, the first rotating shaft 110 can be supported so as to be rotatable around the axis while effectively preventing or reducing damage to the outer surface of the rotating shaft 110, even when the bearing body 2A is disposed so as to support the central part in the axial direction of the first rotating shaft 110 in the case where a rotating shaft to be supported (the first rotating shaft 110) is supported at three or more points.

For example, when the rotating shaft to be supported (the first rotating shaft 110) is long, when the rigidity of the first rotating shaft 110 is poor, and, moreover, when the first rotating shaft 110 needs to be highly accurately supported, one or more central bearing members 117 that support the center in the axial direction of the first rotating shaft 110 are required in addition to a pair of first and second end bearing members 115, 116 that support the respective sides in the axial direction of the first rotating shaft 110 as shown in FIG. 16 and FIG. 17.

In such a case, when a downward load is applied from the second rotary shaft 120 (see FIG. 17) to the first rotating shaft 110, a first intermediate part 111 of the first rotary shaft 110 located between the first end bearing member 115 and the central bearing member 117 is bent downward, with the points of contact with the first end bearing member 115 and the central bearing member 117 being fulcrums.

Similarly, a second intermediate part 112 of the first rotary shaft 110 located between the central bearing member 117 and the second end bearing member 116 is bent downward, with the points of contact with the central bearing member 117 and the second end bearing member 116 being fulcrums.

At this time, the use of the bearing body 2A according to the present embodiment as the central bearing member 117 makes it possible to support the first rotating shaft 110 while effectively preventing or reducing, due to the first-end-surface-side first and second transitional regions 35, 36, damage to the first rotating shaft 110 resulting from downward bending of the first intermediate part 111, and effectively preventing or reducing, due to the second-end-surface-side first and second transitional regions 37, 38, damage to the first rotating shaft 110 resulting from downward bending of the second intermediate part 112.

The bearing body 2A including transitional regions on both sides in the thickness direction (the first-end-surface-side first and second transitional regions 35, 36 and the second-end-surface-side first and second transitional regions 37, 38) is usable as all of the pair of first and second end bearing members 115, 116 that support the respective sides in the axial direction of a rotating shaft to be supported (the first rotating shaft 110) as well as the central bearing member 117 that supports the center in the axial direction of the first rotating shaft 110 as shown in FIG. 16 and FIG. 17.

Accordingly, erroneous attachment of the bearing body 2A does not occur when assembling the sheet conveying structure 102, and workability can be improved.

In the sheet conveying structure 102 shown in FIG. 16 and FIG. 17, while the bearing bodies 2A is used as the first and second end bearing members 115, 116 in addition to the central bearing member 117 as described above, it is possible to use the bearing body 1A according to the first embodiment instead of the bearing body 2A as the first and second end bearing members 115, 116 with using the bearing body 2A as the central bearing member 117.

In this case, the bearing body 1A is disposed such that the first end surface 11 on the side where the first and second transitional regions 35, 36 are provided faces the center side in the axial direction of the first rotating shaft 110.

The first end side first transitional region 35 can be formed by, for example, curving the conventional bearing body 200 having the planar first support surface 231, second support surface 232, and first end surface 211 (see FIG. 10) such that a region bridging the first support surface 231 side and the first end surface 211 side where an imaginary edge 231a (see FIG. 15) between the first support surface 231 and the first end surface 211 is at the center has a curved shape that projects upward.

Also, the first end side second transitional region 36 can be formed by curving the conventional bearing body 200 (see FIG. 10) such that a region bridging the second support surface 232 side and the first end surface 231 side where an imaginary edge 232a (see FIG. 15) between the second support surface 232 and the first end surface 211 is at the center has a curved shape that projects upward.

Similarly, the second end side first transitional region 37 can be formed by curving the conventional bearing body 200 (see FIG. 10) such that a region bridging the first support surface 231 side and the second end surface 213 side where an imaginary edge 231b (see FIG. 15) between the first support surface 231 and the second end surface 213 is at the center has a curved shape that projects upward.

Also, the second end side second transitional region 38 can be formed by curving the conventional bearing body 200 (see FIG. 10) such that a region bridging the second support surface 232 side and the second end surface 213 side where an imaginary edge 232b (see FIG. 15) between the second support surface 232 and the second end surface 213 is at the center has a curved shape that projects upward.

Preferably, the first-end-surface-side first transitional region 35 and the first-end-surface-side second transitional region 36 are symmetrical to the second-end-surface-side first transitional region 37 and the second-end-surface-side second transitional region 38 with respect to an imaginary transverse plane TP (see FIG. 16 and FIG. 17) that is perpendicular to the axis of the first rotating shaft 110 at the center in the thickness direction of the bearing body 2A along the axial direction of the first rotating shaft 110.

The bearing body 2A according to the present embodiment can also be modified in the same manner as in the first embodiment.

Figure 18:
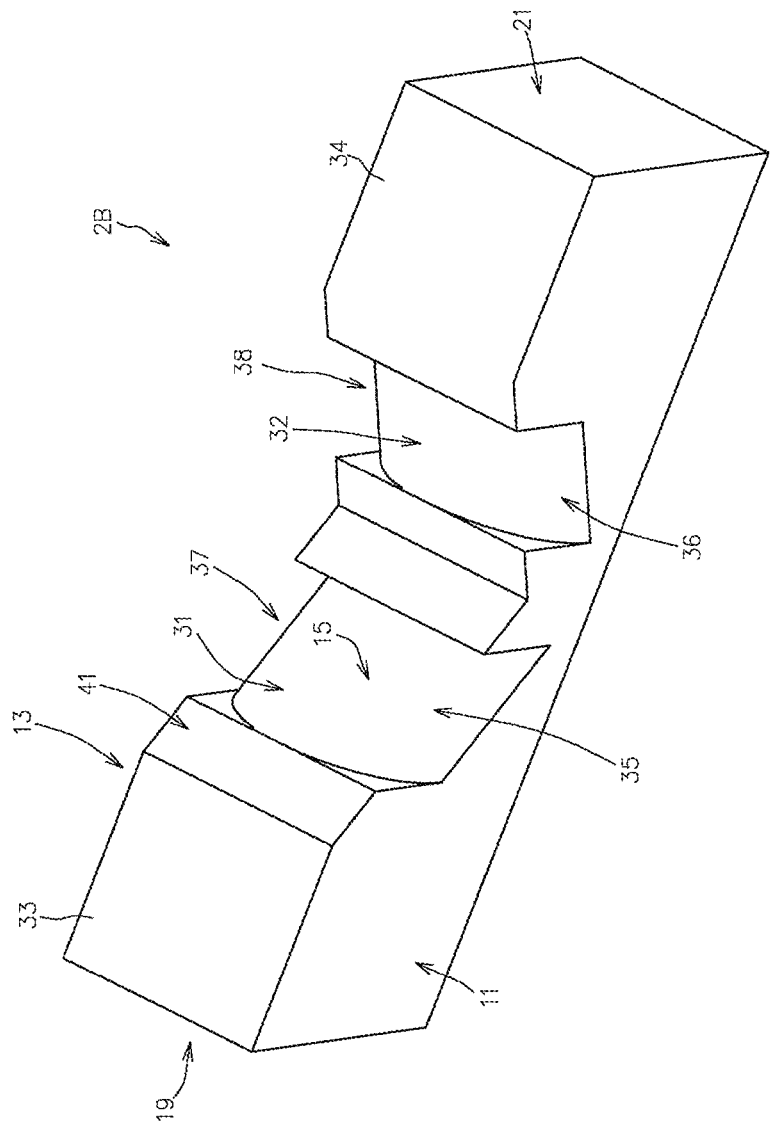
FIG. 18 is a perspective view of a bearing body according to a first modification of the second embodiment.
Figure 19:
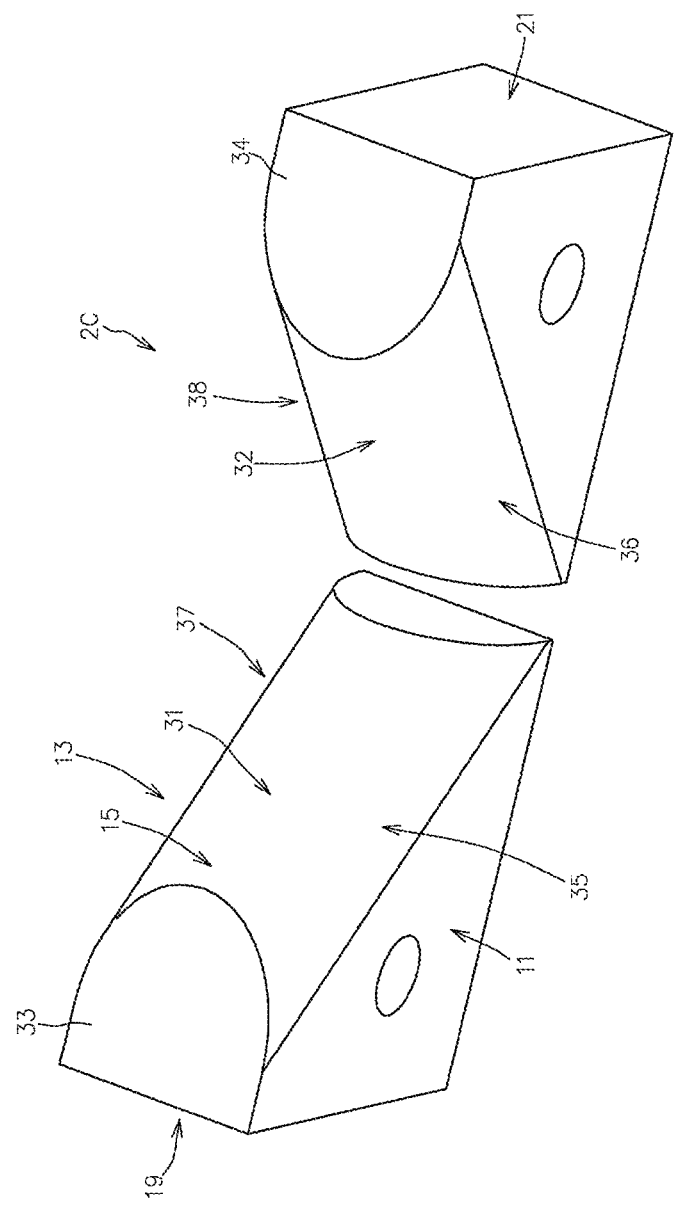
FIG. 19 is a perspective view of a bearing body according to a second modification of the second embodiment.

FIG. 18 to FIG. 20 respectively show perspective views of bearing bodies 2B to 2D according to first to third modifications of the present embodiment.

In the drawings, the same parts as those in the first and second embodiments are given the same reference numbers.

The first to third modifications 2B to 2D respectively correspond to the second to fourth modifications 1C to 1E of the first embodiment.

DESCRIPTION OF THE REFERENCE
NUMERALS 1A-1E, 2A-2D Bearing body
5 First separate bearing body
6 Second separate bearing body
11 first end surface (inner end surface)
13 Second end surface (outer end surface)
15 Upper surface
17 Lower surface
31 First support surface
31a First planar region
32 Second support surface
32a Second planar region
35 First-end-surface-side first transitional region
36 First-end-surface-side second transitional region
37 Second-end-surface-side first transitional region
38 Second-end-surface-side second transitional region
41 First inclined surface
42 Second inclined surface
51 first end surface (inner end surface)
53 Second end surface (outer end surface)
57 Inner circumferential surface

The invention claimed is:

1. A bearing body for supporting a rotating shaft so as to be rotatable around an axis, the bearing body comprising:
a first end surface facing one side in an axial direction of the rotating shaft;
a second end surface facing another side in the axial direction of the rotating shaft; and
a first support surface and a second support surface respectively extending toward a first outer side and a second outer side in a width direction of the rotating shaft from an imaginary central vertical plane passing through an axis of the rotating shaft in the axial direction of the rotating shaft,
wherein the first support surface and the second support surface are symmetrical to each other with respect to the imaginary central vertical plane,
wherein the first support surface and the second support surface are each inclined so as to respectively slope upward from a first side and a second side on the imaginary central vertical plane toward the first outer side and the second outer side such that the rotating shaft disposed therebetween is slidably supported so as to be immovable in the width direction and rotatable around the axis, and
wherein the first support surface and the second support surface respectively transition to the first end surface via a first transitional region and a second transitional region, and the first transitional region and the second transitional region each have a curved shape projecting obliquely upward such that an orientation of a normal line changes from a perpendicular direction to a parallel direction with respect to the axis of the rotating shaft from the another side toward the one side in the axial direction of the rotating shaft,
wherein the first transitional region is provided over the entirety of the first support surface in the axial direction of the rotating shaft, and
wherein the second transitional region is provided over the entirety of the second support surface in the axial direction of the rotating shaft.

2. The bearing body according to claim 1, wherein the first support surface is inclined such that a lowest point of which is where the imaginary central vertical plane passes and such that the first support surface slopes upward from the lowest point toward the first outer side, the second support surface is inclined so as to slope upward from the lowest point toward the second outer side, and the first support surface and the second support surface form a V-groove as viewed in the axial direction of the rotating shaft.

3. The bearing body according to claim 1, wherein the first support surface is inclined such that a lowest point of which is where the imaginary central vertical plane passes and such that the first support surface slopes upward from the lowest point toward one side in the width direction, the second support surface is inclined so as to slope upward from the lowest point toward the other side in the width direction, and the first support surface and the second support surface form a V-groove as viewed in the axial direction of the rotating shaft, and
wherein the first transitional region is provided only in a part of a region between the lowest point and a highest point of the first support surface, and the second transitional region is provided only in a part of a region between the lowest point and the highest point of the second support surface.

4. The bearing body according to claim 1, further comprising a first bearing body having the first support surface and a second bearing body having the second support surface and being separate from the first bearing body.

5. The bearing body according to claim 1, further comprising an upper surface connecting upper ends of the first end surface and the second end surface to each other and a lower surface connecting lower ends of the first end surface and the second end surface to each other and forming an installation surface, wherein the first support surface and the second support surface are provided on the upper surface.

6. The bearing body according to claim 1, wherein the bearing body has a ring shape,
wherein the first end surface and the second end surface are annular, and
wherein the first support surface and the second support surface are provided on an inner circumferential surface connecting radially inner ends of the first end surface and the second end surface to each other.

7. A bearing body for supporting a rotating shaft so as to be rotatable around an axis, the bearing body comprising:
a first end surface facing one side in an axial direction of the rotating shaft;
a second end surface facing another side in the axial direction of the rotating shaft; and
a first support surface and a second support surface respectively extending toward a first outer side and a second outer side in a width direction of the rotating shaft from an imaginary central vertical plane passing through an axis of the rotating shaft in the axial direction of the rotating shaft,
wherein the first support surface and the second support surface are symmetrical to each other with respect to the imaginary central vertical plane,
wherein the first support surface and the second support surface are each inclined so as to respectively slope upward from a first side and a second side on the imaginary central vertical plane toward the first outer side and the second outer side such that the rotating shaft disposed therebetween is slidably supported so as to be immovable in the width direction and rotatable around the axis,
wherein the first support surface and the second support surface respectively transition to the first end surface via a first transitional region and a second transitional region, and the first transitional region and the second transitional region each have a curved shape projecting obliquely upward such that an orientation of a normal line changes from a perpendicular direction to a parallel direction with respect to the axis of the rotating shaft from the another side toward the one side in the axial direction of the rotating shaft, wherein the first support surface and the second support surface respectively have a first planar region and second planar region extending from the second end surface from the another side toward the one side in the axial direction of the rotating shaft and terminating within a thickness of the bearing body, wherein the first transitional region starts from the one side in the axial direction of the first planar region, and wherein the second transitional region starts from the one side in the axial direction of the second planar region.

8. A bearing body for supporting a rotating shaft so as to be rotatable around an axis, the bearing body comprising:
a first end surface and a second end surface respectively facing one side and another side in an axial direction of the rotating shaft; and
a first support surface and a second support surface respectively disposed more toward a first outer side and a second outer side in a width direction of the rotating shaft than an imaginary central vertical plane passing through an axis of the rotating shaft in the axial direction of the rotating shaft,
wherein the first support surface and the second support surface are symmetrical to each other with respect to the imaginary central vertical plane,
wherein the first support surface and the second support surface are each inclined so as to slope upward from a side on the imaginary central vertical plane toward the first outer side and the second outer side such that the rotating shaft disposed therebetween is slidably supported so as to be immovable in the width direction and rotatable around the axis,
wherein the first support surface and the second support surface each transition to the first end surface respectively via a first-end-surface-side first transitional region and a first-end-surface-side second transitional region that are symmetrical to each other with respect to the imaginary central vertical plane, and transition to the second end surface respectively via a second-end-surface-side first transitional region and a second-end-surface-side second transitional region that are symmetrical to each other with respect to the imaginary central vertical plane, wherein the first-end-surface-side first transitional region and the first-end-surface-side second transitional region each have a curved shape projecting obliquely upward such that an orientation of a normal line changes from a perpendicular direction to a parallel direction with respect to the axis of the rotating shaft toward the one side in the axial direction of the rotating shaft, and wherein the second-end-surface-side first transitional region and the second-end-surface-side second transitional region each have a curved shape projecting obliquely upward such that an orientation of a normal line changes from a perpendicular direction to a parallel direction with respect to the axis of the rotating shaft toward the another side in the axial direction of the rotating shaft, wherein the first support surface is inclined such that a lowest point of which is where the imaginary central vertical plane passes and such that the first support surface slopes upward from the lowest point toward the first outer side, the second support surface is inclined so as to slope upward from the lowest point toward the second outer side, and the first support surface and the second support surface form a V-groove as viewed in the axial direction of the rotating shaft, wherein the first transitional region is provided over the entirety of the first support surface in the width direction of the rotating shaft, and wherein the second transitional region is provided over the entirety of the second support surface in the width direction of the rotating shaft.

9. The bearing body according to claim 8, wherein the first-end-surface-side first transitional region and the first-end-surface-side second transitional region are symmetrical to the second-end-surface-side first transitional region and the second-end-surface-side second transitional region with respect to a second imaginary central vertical plane passing through an axis of the rotating shaft in the width direction of the rotating shaft.

* * * * *

UNITED STATES PATENT AND TRADEMARK OFFICE
CERTIFICATE OF CORRECTION

PATENT NO. : 11,209,044 B2
APPLICATION NO. : 16/647406
DATED : December 28, 2021
INVENTOR(S) : Inoue Page 1 of 1

It is certified that error appears in the above-identified patent and that said Letters Patent is hereby corrected as shown below:

In the Claims

In Column 15, Claim 1, Line 47, delete "axis, and" and insert -- axis, --, therefor.

Signed and Sealed this
Fifth Day of April, 2022

Drew Hirshfeld
*Performing the Functions and Duties of the
Under Secretary of Commerce for Intellectual Property and
Director of the United States Patent and Trademark Office*